(12) United States Patent
Cruz et al.

(10) Patent No.: US 8,118,964 B2
(45) Date of Patent: Feb. 21, 2012

(54) ASSEMBLY OF DATA STORAGE COMPONENTS

(75) Inventors: Dennis Quinto Cruz, Longmont, CO (US); Jonathan Pahl Jones, Longmont, CO (US); Jason Paul Delaney, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 993 days.

(21) Appl. No.: 12/037,661

(22) Filed: Feb. 26, 2008

(65) Prior Publication Data

US 2009/0211701 A1     Aug. 27, 2009

(51) Int. Cl.
B32B 37/12        (2006.01)

(52) U.S. Cl. .................. 156/272.2; 156/293

(58) Field of Classification Search ........... 156/272.2, 156/275.3, 275.7, 293, 294
See application file for complete search history.

(56) References Cited

U.S. PATENT DOCUMENTS

| | | | |
|---|---|---|---|
| 3,635,754 A | 1/1972 | Beede | |
| 4,783,504 A | 11/1988 | St. Clair et al. | |
| 4,796,252 A * | 1/1989 | Maan | 359/819 |
| 4,829,395 A | 5/1989 | Coon et al. | |
| 5,734,523 A | 3/1998 | Scheidecker et al. | |
| 5,759,418 A | 6/1998 | Frater et al. | |
| 5,768,062 A | 6/1998 | Anderson et al. | |
| 5,783,867 A | 7/1998 | Belke, Jr. et al. | |
| 5,808,835 A | 9/1998 | Fujiwara | |
| 5,812,341 A * | 9/1998 | Boutaghou et al. | 360/99.08 |
| 5,841,609 A | 11/1998 | Tochiyama | |
| 5,877,919 A | 3/1999 | Foisy et al. | |
| 6,021,023 A | 2/2000 | Hillman | |
| 6,200,408 B1 * | 3/2001 | Bayer et al. | 156/273.3 |
| 6,296,734 B1 * | 10/2001 | Albertson et al. | 156/275.5 |
| 6,704,165 B2 | 3/2004 | Kube et al. | |
| 6,980,401 B1 * | 12/2005 | Narayanan et al. | 360/265.8 |
| 2004/0121618 A1 * | 6/2004 | Moore | 438/782 |
| 2004/0154036 A1 * | 8/2004 | Saito | 720/697 |
| 2006/0292377 A1 * | 12/2006 | Hoffman et al. | 428/414 |

FOREIGN PATENT DOCUMENTS

DE         3137981 A1 *   4/1983

OTHER PUBLICATIONS

EPO Machine Translation of DE 3137981 A1, Apr. 1983.*

* cited by examiner

Primary Examiner — Richard Crispino
Assistant Examiner — Daniel McNally
(74) Attorney, Agent, or Firm — Fellers, Snider, et al.

(57) ABSTRACT

A process for assembling data storage components in which a cylindrically shaped first structure of a data storage device is inserted into an aperture of a second structure, the first structure having a circumferentially extending outer surface and the aperture of the second structure having an aperture sidewall. An annular gap is formed between the outer surface of the first structure and the inner sidewall of the aperture of the second structure, and a plurality of discrete dots of adhesive are placed to span the annular gap following which the adhesive is cured by exposing the adhesive to ultraviolet radiation to attaches the first and second structures into a sub-assembly.

20 Claims, 5 Drawing Sheets

ASSEMBLY OF DATA STORAGE COMPONENTS

FIELD OF INVENTION

The present invention relates generally to the field of manufacturing, and more particularly but not by way of limitation, to a method for assembly components of data storage devices.

BACKGROUND

A typical assembly method for data storage devices is that of swaging a head gimbal assembly (HGA) to the tip of an actuator arm or actuator arms to the bearing assembly of an actuator motor. Typical of problems incurred in such manufacturing is that swaging and similar mechanical metal joining methods can create deformation in the supporting base plate, which in turn can cause gram loading, roll static attitude changes (RSA) and pitch static attitude (PSA) in components such as actuator arms. Also, these manufacturing processes can result in high resonance variations in storage device components.

Further, these mechanical processes are generally excessively costly, adding to costs identified by analyzing the bill of materials (BOM) of the component assemblies, such as for example the actuator assembly. With this regard, a process known as stackable arm adhesive process (SAAP) has been adopted as an improvement over the mechanical swaging techniques of the past, an improvement reflected in reduction of the BOM (bill of materials) costs. The SAAP process, using adhesive to join the components, has not only improved costs, it has had a degree of beneficial quality effects However, the stackable arm adhesive process (SAAP) has not proved to be very effective in reducing the labor overhead (LOH) cost of component assembly due to lower unit per hour (UPH) production costs and the attendant increase in capital tooling investment. Such deleterious effects on total unit cost (TUC) is understandable since the stackable arm adhesive process (SAAP) is a two part process that includes UV exposure of the adhesive, followed by a heat clamping step for final curing of the adhesive that is sandwiched between the adhering parts.

There is a need for an adhesive bonding method that eliminates, or substantially reduces, the deleterious effects of mechanical steps such as swaging, while eliminating the cost deficiencies of previously known adhesive assembly processes. The present invention fills such need.

SUMMARY OF THE INVENTION

In accordance with various embodiments, the present invention provides a process for assembling data storage components in which a cylindrically shaped first structure is inserted into an aperture of a second structure, the first structure having a circumferentially extending outer surface and the aperture of the second structure having an aperture sidewall. An annular gap is formed between the outer surface of the first structure and the inner sidewall of the aperture of the second structure.

A plurality of discrete dots of adhesive are placed to span the annular gap, and the adhesive is cured by exposing the adhesive to ultraviolet radiation, and once set, the adhesive attaches the first and second structures into a sub-assembly.

In one embodiment, the first structure is an actuator arm of a data storage device, and the second structure is a separator spacer member that, once adhered by the present inventive process, the separator spacer member attaches a flex suspension member to the end of the actuator arm.

In another embodiment, the first structure is an actuator arm of a data storage device, and the second structure is an actuator bearing cylinder of a data storage device.

The various features and advantages that characterize the claimed invention will be apparent upon reading the following detailed description and reviewing associated drawings with the appended claims.

DESCRIPTION

Figure 1:
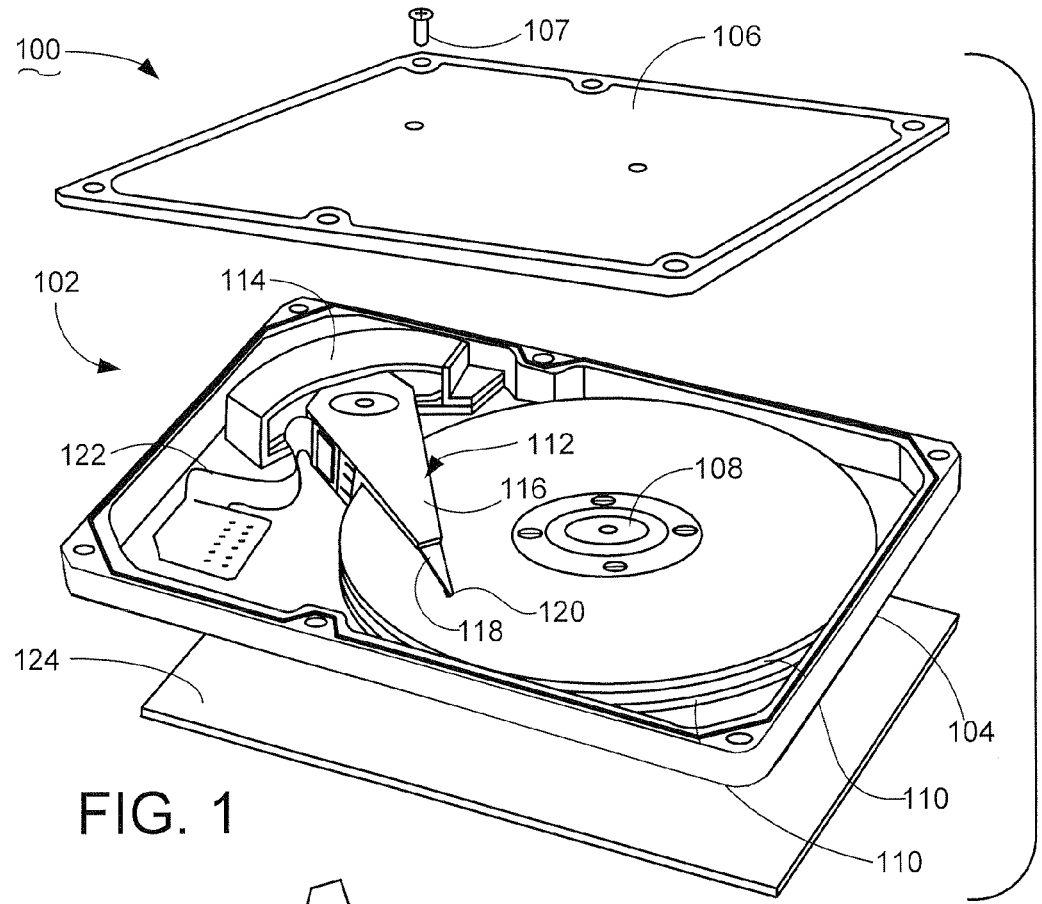
FIG. 1 is an exploded view of a particular data storage device for which the present invention finds application.

To provide an exemplary environment in which preferred embodiments of the present invention can be advantageously practiced, FIG. 1 provides an exploded view of a data storage device 100 of the type configured to store and retrieve computerized data.

A housing 102 is formed from a base deck 104 and a top cover 106 that is sealingly attached thereto by a number of screw members 107 (one shown). A spindle motor 108 is mounted within the housing 102 to support and rotate a number of magnetic data storage discs 110 (in this case FIG. 1 depicts a pair of such discs) at a relatively high rotational velocity.

An actuator assembly 112 having an actuator motor 114 (also characterized as a voice coil motor, or VCM). The actuator assembly 112 has a plurality of rigid actuator arms 116 that extend toward the media discs 110 as shown. Flexure suspensions 118 are supported at the distal ends of the actuator arms 116 to support data transducers 120 in near proximity to the recording surfaces of the media discs 110.

A flex circuit assembly 122 establishes electrical communication paths between the actuator assembly 112 and a printed circuit board (PCB) 124. The PCB 124 serves to support various circuits and connectors (not separately shown) that facilitate control of the device 100 and communication with a host computer.

It is common for the device 100 to be fabricated in an automated manufacturing environment at a large number of substantially identical devices are produced each production hour. It is usual of conveying mechanisms to deliver the component parts of the data storage device 100 to a series of automated assembly stations that sequentially assemble the devices to final form.

Figure 2:
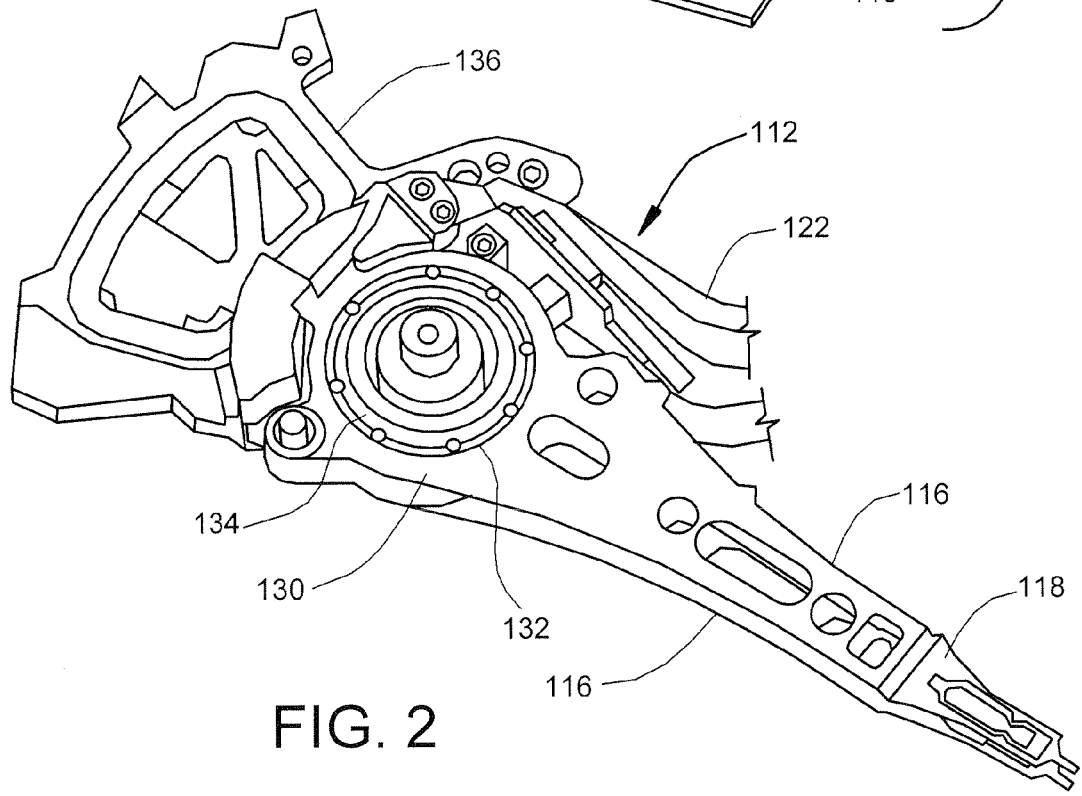
FIG. 2 is a partial perspective view of the actuator assembly of the data storage device of FIG. 1.
Figure 3:
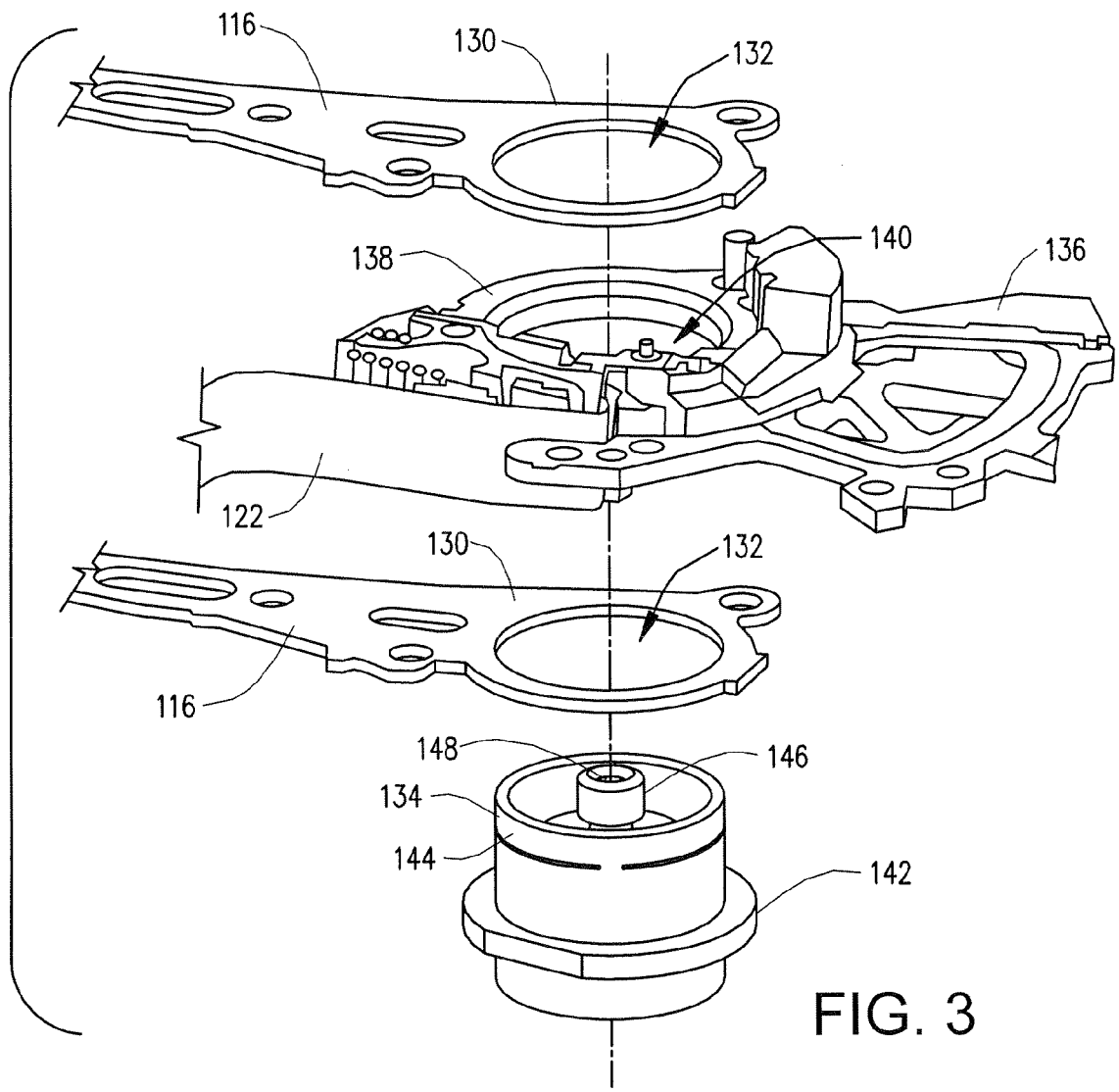
FIG. 3 is a partial, explosive view of the actuator assembly of FIG. 2.

In the present invention, certain of the components of the data storage device 100 are interconnected by means of adhesive during the assembly process; for example, the actuator assembly 112 as depicted in FIG. 2. Each of the actuator arms 116 has a bearing end 130 that has a cylindrical opening 132 that is dimensioned to fit over an actuator bearing cylinder 134. As shown in the exploded view of FIG. 3, a VCM arm member 136 of the VCM 114 has a support portion 138 with a cylindrical opening 140 that is dimensioned to also fit over the actuator bearing cylinder 134, the actuator bearing cylinder 134 having a bearing cylinder shoulder 142.

In assembling these components into a unit, the actuator bearing cylinder 134 is positioned in a holding implement or jig, and the pair of actuator arms 116, with the support portion 138 of the VCM arm member 136 sandwiched there between, are placed over the bearing cylinder 134 to rest on the bearing shoulder 142. It will be noted that the bearing cylinder 134 has an outer barrel race 144 that is supported for rotation on an inner, stationary hub member 146, and the hub member 146 has a centered hub bore 148 through which a fastening bolt (not shown) extends to attach the hub member 144 to the base deck 104.

Figure 4:
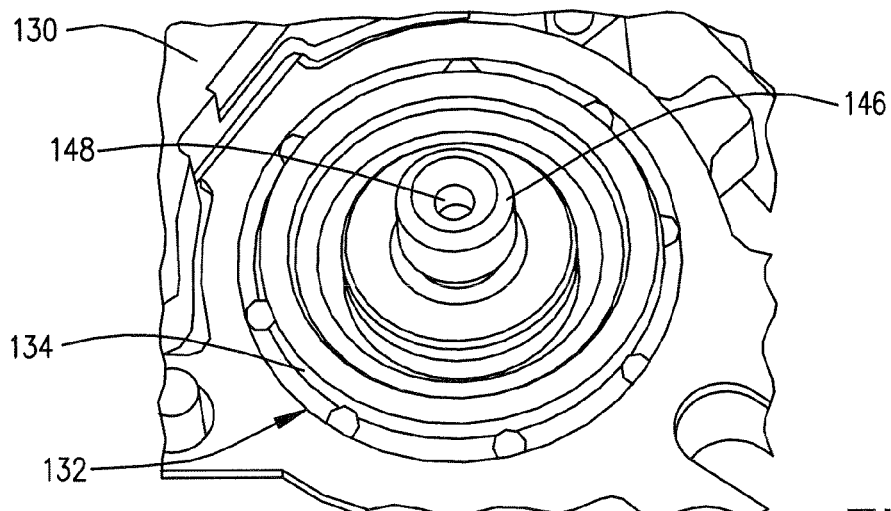
FIG. 4 is an enlarged partial, perspective view of the top of the actuator bearing cylinder and supported top actuator arm.

FIG. 4, an enlarged perspective view of the top of the loaded bearing cylinder 134, illustrates the placement of several adhesive dots 150 between the upper actuator arm 116 and the outer barrel race 144. While only the upper layer of adhesive dots 150 is depicted in this view, there is an adhesive layer of dots 150 at each of the actuator arms 116 and at the support portion 138 of the VCM arm 136.

It is contemplated that the device 100 will be fabricated in an automated manufacturing environment wherein a very large number of nominally identical devices will be produced each day. Such manufacturing is preferably carried out by conveying pallets to a series of automated assembly stations which sequentially assemble the devices to final form.

In support of such assembly, various component assemblies will pass through automated pre-assembly stations at which components are attached together using adhesive, such as the flex suspensions 118 to the ends of the actuator arms 116, and the actuator arms 116 and VCM arm member 136 to the actuator bearing cylinder 134, both of which pre-assemblies will be illustrated and described herein. Other components can be advantageously adjoined using adhesive as well, including the transducers 120 to the suspensions 118 and the flex circuit assembly 122 to the base deck 102.

The adhesive dots 150 are preferably characterized as a non-aromatic, flexible, non-chain linear epoxy with no cross-linking. The adhesive formulation further preferably is made of a super acid catalyst and a photo initiator to enhance the polymerization or curing process. A suitable fluorescent agent can also be added to the adhesive formulation as desired. Suitable formulations can be commercially obtained from a number of sources, including The Henkel Group, Dusseldorf, Germany, and the Adhesive Research Inc.

The adhesive that forms the adhesive dots 150 is preferably selected to have a glass transition temperature that is lower than the specified operating/storage temperature requirement range for the application. The glass transition temperature is the temperature at which a polymer transitions from a generally viscous (rubber) state to a solid, amorphous (glass) state. It should be noted that the glass temperature can be expected to vary widely for different polymers, and that the transition from rubber to glass will usually be gradual rather than at a discrete temperature.

For example, it is contemplated that the data storage device 100 might be required by its performance specifications to be operable over a temperature range of 5° C. to 85° C. The glass transition temperature for the adhesive dots is preferably substantially below this temperature range, such as minus 25° C.

As used herein, the term adhesive dots, such as in the adhesive dots 150, refers to incremental amounts of adhesive separated and spaced apart on a surface that is to be adhered to another surface. That is, the dots are spaced apart at a distance that can be varied as necessary for sufficient bonding strength both upon initial deposition and following a UV or heat cure.

Figure 5:
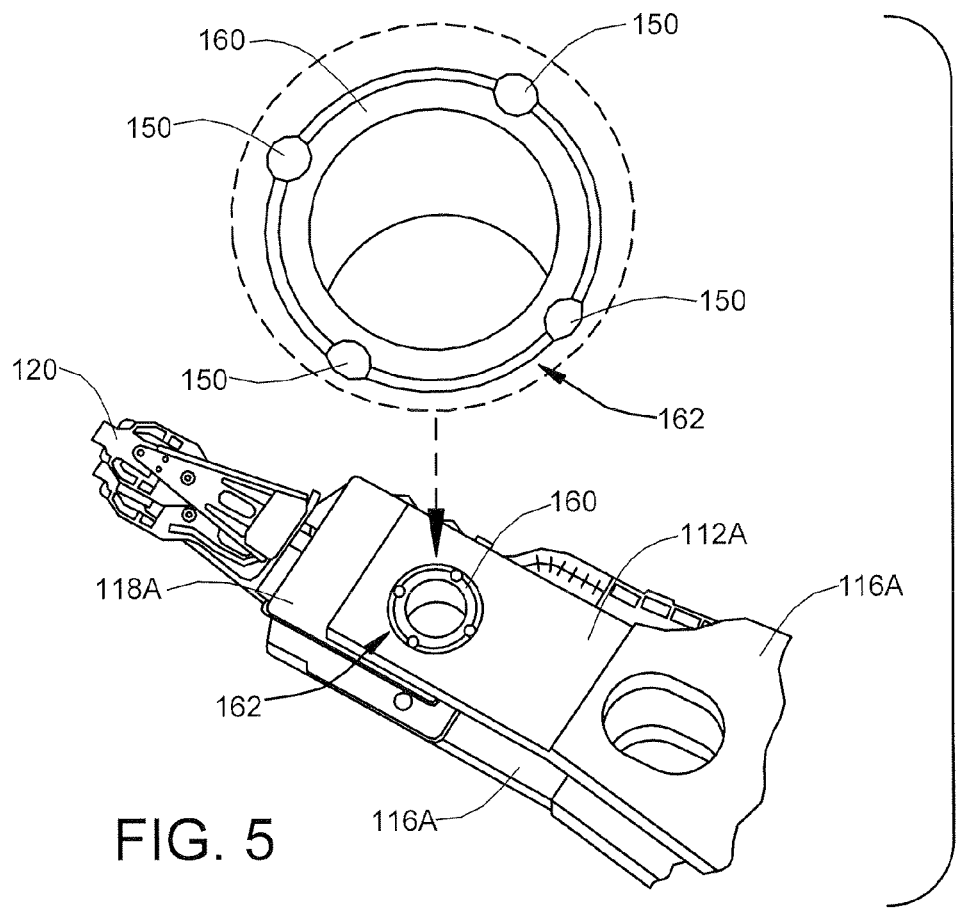
FIG. 5 is a partial, perspective view of the flexure end of a pair of actuator arms of a non-stackable type of actuator assembly having a cylindrical boss (shown in enlarged view) on the head gimbal assembly.

One more example of components of data storage devices (of which the data storage device 100 is an example) that are subject to automated component assembly is that of the joinder of the suspension members (HGAs) 118A to the actuator arms 116A of a non-stackable HSA, a portion of which is shown in FIG. 5. As depicted in FIG. 5, a cylindrically shaped separator spacer member 160 (also sometimes referred to as cylindrical bosses) is extensive from the flexure assemblies 118A and is adhered in opening 162 in the distal end of the actuator arms 116A. Adhesive dots 150 are positioned around the separator spacer 160 in the annular gap between the separator spacer 160 and the sidewall of the opening in the flex suspensions 118A; and this is done at each layer to rigidly attach the gimbal assemblies, or flexure assemblies 118A with the data transducers 120, to the actuator arms 116A.

While the present invention will be illustrated with the cylinder separator spacer 160, it is diagrammatically representative of cylindrically shaped bosses that can be formed as parts of the flexure suspension 118A, and in that case, each boss can be adhesively attached to an actuator arm in the manner described for the cylinder separator spacer 160. Of course, where boss extensions are to be utilized in lieu of the cylinder separator spacer 160, the bosses can be stamp formed in a step that is followed by a cleaning step, in which case there will be no particulate debris created at the assembly station.

Figure 6:
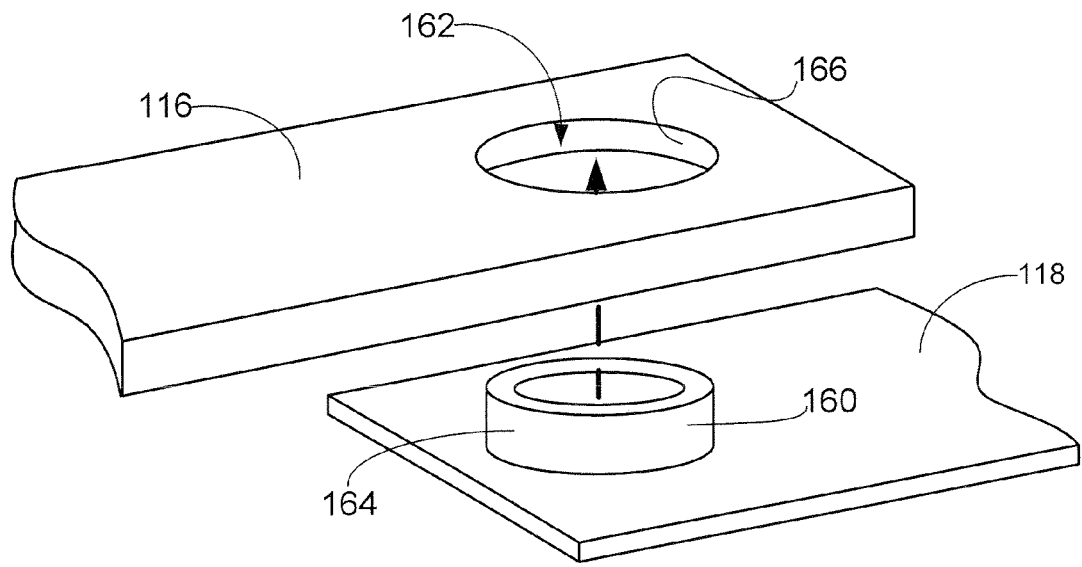
FIG. 6 is a diagrammatical representation of the end of an actuator arm and a cylinder separator spacer member.

To provide a more graphic illustration of the adhesive placement of the present invention, a simplified diagram is provided in FIG. 6 in which the actuator arm 116 having the opening or aperture 162 is shown. Beneath the actuator arm 116 is depicted the cylinder separator spacer 160, which is depicted as a hollow member having a cylindrical outer surface 164. Adhesive dots 150 spaced in the annular gap about the outer surface 164 will attach the separator spacer to the actuator arm 116. The adhesive dots 150 can be placed on the cylinder separator spacer 160 prior to insertion into the opening 162, or the adhesive dots 150 can be positioned following the insertion of the separator spacer 160 into the opening 162.

The thickness of the actuator arm 116 will be reflected in the opening 162 having a peripheral inner surface 166, and it is to this inner surface 166 to which the adhesive dots 150 will be disposed, and once cured, the adhesive dots 150 will adhere the cylinder separator spacer 160 to the actuator arm 116.

Figure 7:
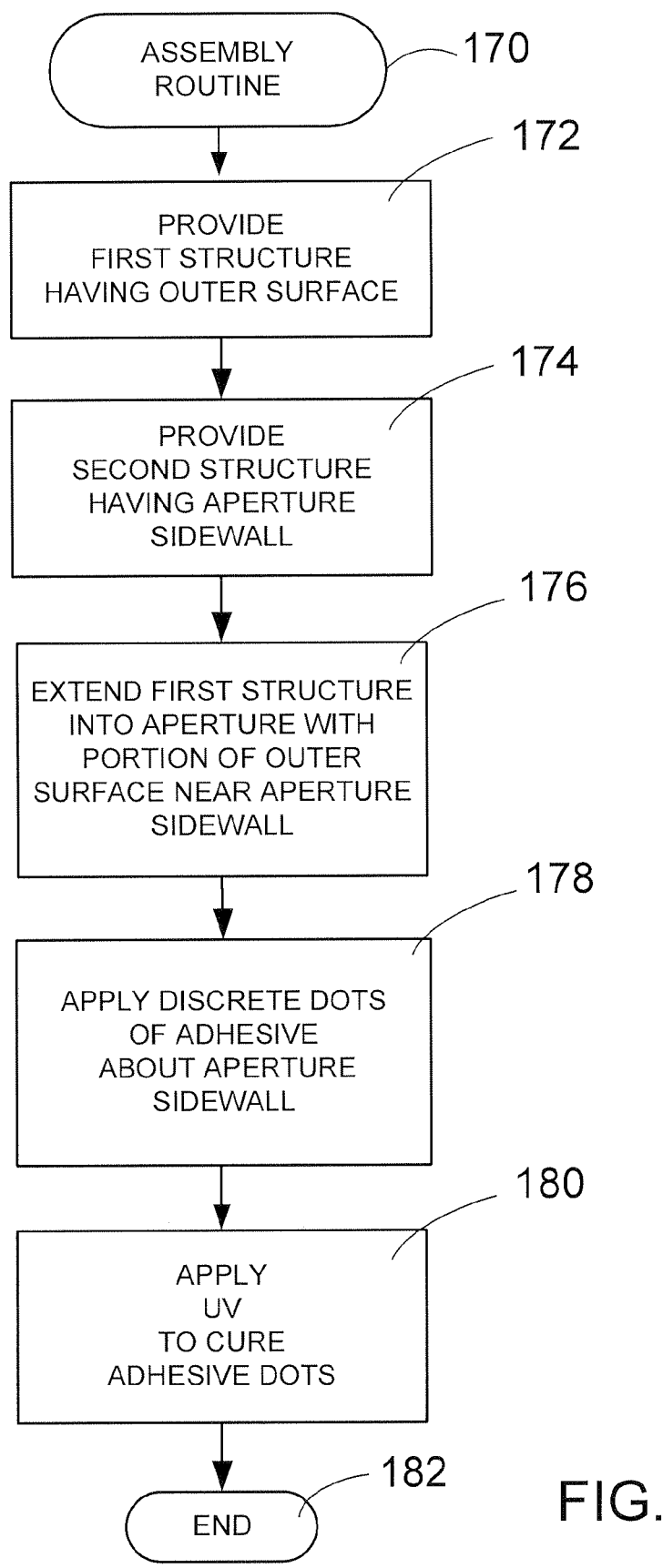
FIG. 7 is a flow diagram of an assembly routine according to the present invention.
Figure 8:
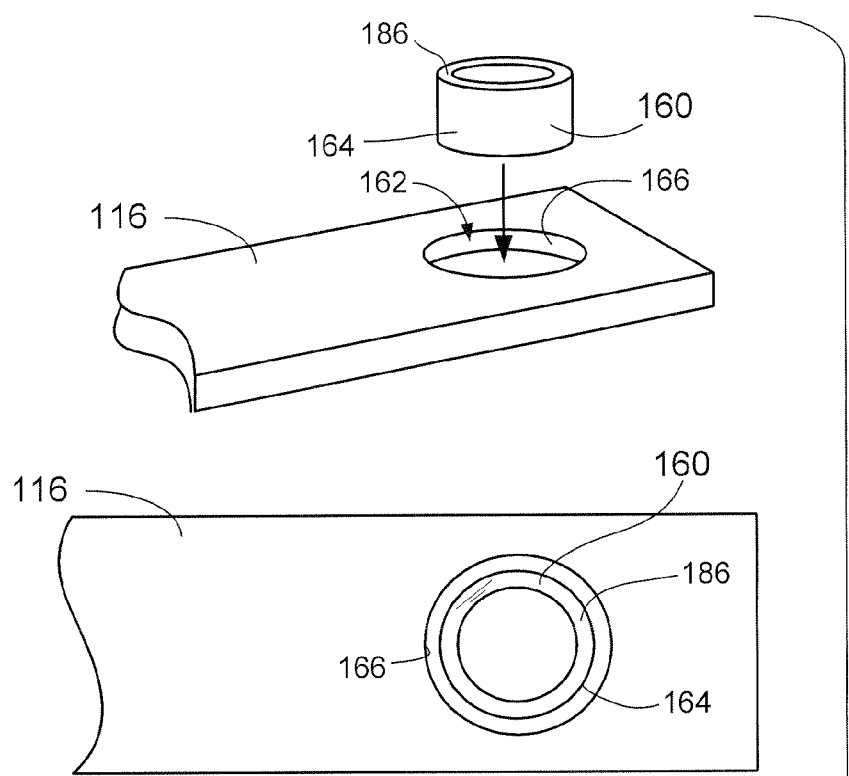
FIG. 8 is a diagrammatical representation of the assembly steps of the assembly routine of FIG. 7.
Figure 8:
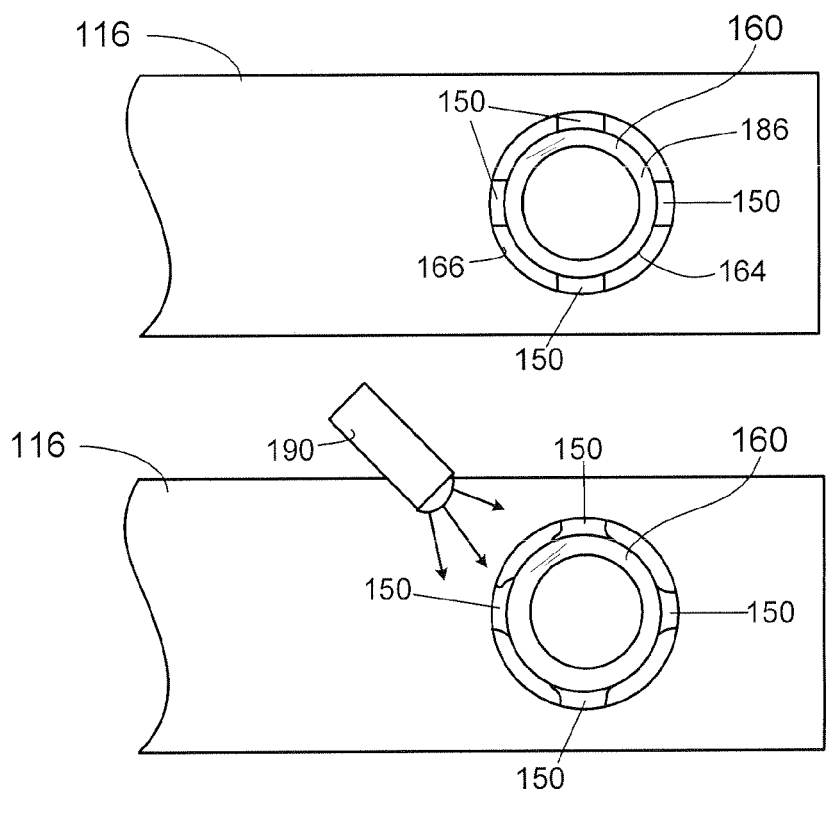

FIG. 7 provides a flow chart for an assembly routine 170 that is illustrative of steps carried out in accordance with preferred embodiments of the present invention to insert and attach a separator spacer (or boss) into an opening in an actuator arm. FIG. 8 provides a sequence of views corresponding to the various steps of FIG. 7 using the arm 116 and cylinder separator spacer 160 of FIG. 6 as illustrative example.

Referring to FIG. 7, at the first step 172, a first structure having an outer surface is provided at the pre-assembly station. At the next step 174, a second structure having an aperture with an aperture wall is provided. At the next step 176, the first structure is positioned to extend into the aperture so that a portion of the outer surface is disposed in near proximity with the sidewall of the aperture of the second structure. At step 178, discrete adhesive dots are placed in about the aperture wall in the annular gap so as to extend between the aperture sidewall and the outer surface of the first structure. At step 180, the adhesive dots are exposed to ultraviolet (radiation from a UV source. Finally, the flow ends at step 182.

Turning to FIG. 8, the assembly routine 170 at step 172 calls for providing the separator spacer or first member 160 at the pre-assembly station. The separator spacer 160 has an outer circumferential outer surface 164 and an upper end 186. Step 174 calls for providing the actuator arm or second member 116 at the pre-assembly station. As stated herein above, the opening or aperture 162 extends through the distal end of each actuator 116, and the aperture 162 has an aperture sidewall 166.

Next, at step 176, the separator spacer 160 is positioned to partially extend into the aperture 162 so that a portion of the outer surface 164 is disposed in near proximity to the sidewall 166, thereby forming an annular gap around the separator spacer 160. Next, at step 178, adhesive dots 150 are placed to span this annular gap, extending between the sidewall 166 of the aperture 162 and the outer wall 164 of the separator spacer 160.

At next step 180, the adhesive dots 150 are cured by exposure to ultraviolet radiation from a UV source 190. The UV activation of the adhesive 150 initiates the curing process, and for formulations such as described above, this will result in the start of a "green time," or reasonably short period of time (typically a few minutes) during which the adhesive 150 will soften and adhere to the second member, and because of the isolation and small size of the dots of adhesive, the adhesive will air cure quickly and return to rigidity.

While the curing step has been described as being initiated with the application of UV radiation from the UV source 190, it will be appreciated that thermal energy can be used in lieu of the UV radiation. The temperature that will be targeted for initiating the cure will be lower than that required for a conventional thermal set (e.g., on the order of perhaps 300° C. as opposed to about 500° C. or higher). The adhesive, following being heated, returns to ambient temperature and the adhesive substantially achieves a finalized cured state.

While the steps of the present invention have been described in detail with reference to the separator spacer 160 being adhered to the actuator arm 116, it will be appreciated that the separator spacer 160 is also adhered to the flex arm 118 in the fixture by the same routine of placemen of the separator spacer into an aperture in the flex arm 118, placing adhesive dots 150 about the separator spacer 160 and curing the adhesive dots 150 by the application of UV radiation, or alternatively, the application of thermal energy.

Furthermore, the steps 170-182 apply equally to assembling the actuator 112, that is, assembling and connecting the actuator arms 116 and the VCM arm member 136 to the actuator bearing cylinder 134. As mentioned above, FIG. 4 shows the position of the spaced apart adhesive dots 150 between the top actuator arm 116 and the actuator bearing cylinder.

One further statement should now be made with respect to the shapes of the structures that may be attached together to form a sub-assembly of the cylindrically shaped separator spacers and the actuator bearing cylinder. It should be noted that the present invention is not intended to be limited to such shapes, as other shapes can as well be attached by the process of the present invention, such as multiple sided members and apertures so long as there is a corresponding gap in which discrete adhesive dots can be positioned and cured to adhere between surfaces of such members.

While the various embodiments presented herein are generally provided in the context of a data storage device, it will be appreciated that this is merely for purposes of illustration and is not limiting. Rather, the exemplary printed circuit assembly as disclosed herein can be readily used in any number of other environments as desired.

It will be clear that the various embodiments presented herein are well adapted to carry out the objects and attain the ends and advantages mentioned as well as those inherent therein. While presently preferred embodiments have been described for purposes of this disclosure, numerous changes may be made that will readily suggest themselves to those skilled in the art and that are encompassed in the spirit of the invention disclosed and as defined in the appended claims.

What is claimed is:

1. A process for assembling components comprising the steps of:
   inserting an actuator bearing cylinder having a circumferentially extending outer surface into a corresponding aperture defined by an internal sidewall of an actuator arm so that an annular gap extends around the outer surface of the boss and between the outer surface and the internal sidewall;
   applying a plurality of discrete dots of adhesive to correspondingly span said gap; and
   curing the adhesive to form a plurality of discrete, spaced-apart cured adhesive dots adapted to adhere the actuator bearing cylinder in the aperture of the actuator arm.

2. The process of claim 1 wherein the curing step comprises:
   exposing the adhesive dots to a source of ultraviolet radiation.

3. The process of claim 2 wherein the adhesive is a non-aromatic, flexible, non-chain linear epoxy having no cross linking.

4. The process of claim 3 wherein the adhesive is further characterized as made of a super acid catalyst and a photo initiator.

5. The process of claim 4 wherein the adhesive is further characterized as containing a fluorescent agent.

6. The process of claim 1 wherein the curing step comprises:
   exposing the adhesive dots to a source of thermal radiation.

7. The process of claim 1, in which the plurality of discrete dots of adhesive applied during the applying step are arranged to be angularly symmetric about a central axis.

8. The process of claim 1, in which an intervening gap is provided between each adjacent pair of the plurality of discrete dots of adhesive applied during the applying step, each gap having a common length.

9. A process for pre-assembling components comprising the steps of:
   providing a separator spacer member having an outer surface at a pre-assembly station;
   providing an actuator arm having an aperture having an aperture sidewall at the pre-assembly station;
   extending the separator spacer member into the aperture of the actuator arm to form an annular gap between the aperture sidewall and the separator spacer member;
   applying a plurality of discrete spaced apart adhesive dots to span the annular gap; and
   applying ultraviolet radiation to cure the spaced apart adhesive dots to form a plurality of discrete, spaced-apart cured adhesive dots adapted to attach the actuator arm and a flex suspension to the annular sidewall of the separator spacer member.

10. The process of claim 9 wherein the adhesive is a non-aromatic, flexible, non-chain linear epoxy having no cross linking.

11. The process of claim 10 wherein the adhesive is further characterized as made of a super acid catalyst and a photo initiator.

12. The process of claim 11 wherein the adhesive is further characterized as containing a fluorescent agent.

13. A process comprising:
inserting a first structure having a circumferentially extending, cylindrically shaped outer surface into a corresponding aperture defined by a circumferentially extending, cylindrically shaped internal sidewall of a second structure so that an annular gap of uniform width fully surrounds the first structure between the outer surface and the internal sidewall;
applying a plurality of discrete dots of adhesive to correspondingly span said gap and contact the respective outer surface and the internal sidewall; and
curing the adhesive to form a plurality of discrete, spaced-apart cured adhesive dots adapted to adhere the first structure in the aperture of the second structure.

14. The process of claim 13 in which the first structure is an actuator bearing cylinder of a data storage device, and the second structure is an actuator arm of the data storage device.

15. The process of claim 14, further comprising steps of inserting the actuator bearing cylinder into an aperture of a voice coil motor (VCM) arm member to bring the VCM arm member into contacting engagement with the actuator arm, and attaching the VCM arm member to the actuator bearing cylinder using a plurality of spaced apart adhesive dots.

16. The process of claim 13, in which the first structure comprises a first base portion with a first planar surface and a boss portion which extends from the first base portion, the boss portion having said circumferentially extending, cylindrically shaped outer surface, and in which the second structure comprises a second base portion through which the aperture extends, the second base portion comprising a second planar surface in facing relation to the first planar surface, and in which the inserting step comprises inserting the boss portion into the aperture and bringing the first planar surface into contacting engagement with the second planar surface.

17. The process of claim 13, in which the first structure is characterized as a separator member, and in which the second structure is characterized as an actuator arm to which both the separator member and a flex suspension are adhered by the adhesive.

18. The process of claim 13, in which the curing step comprises exposing the adhesive dots to a source of ultraviolet radiation.

19. The process of claim 13, in which the curing step comprises exposing the adhesive dots to a source of thermal radiation.

20. The process of claim 13, in which the plurality of discrete dots of adhesive applied during the applying step are arranged to be angularly symmetric about a central axis.

* * * * *